Nov. 11, 1958 G. WALTER 2,859,634
MARINE V-DRIVE

Filed Sept. 8, 1954 2 Sheets-Sheet 1

INVENTOR
Gustave Walter

BY Mawhinney + Mawhinney

ATTORNEYS

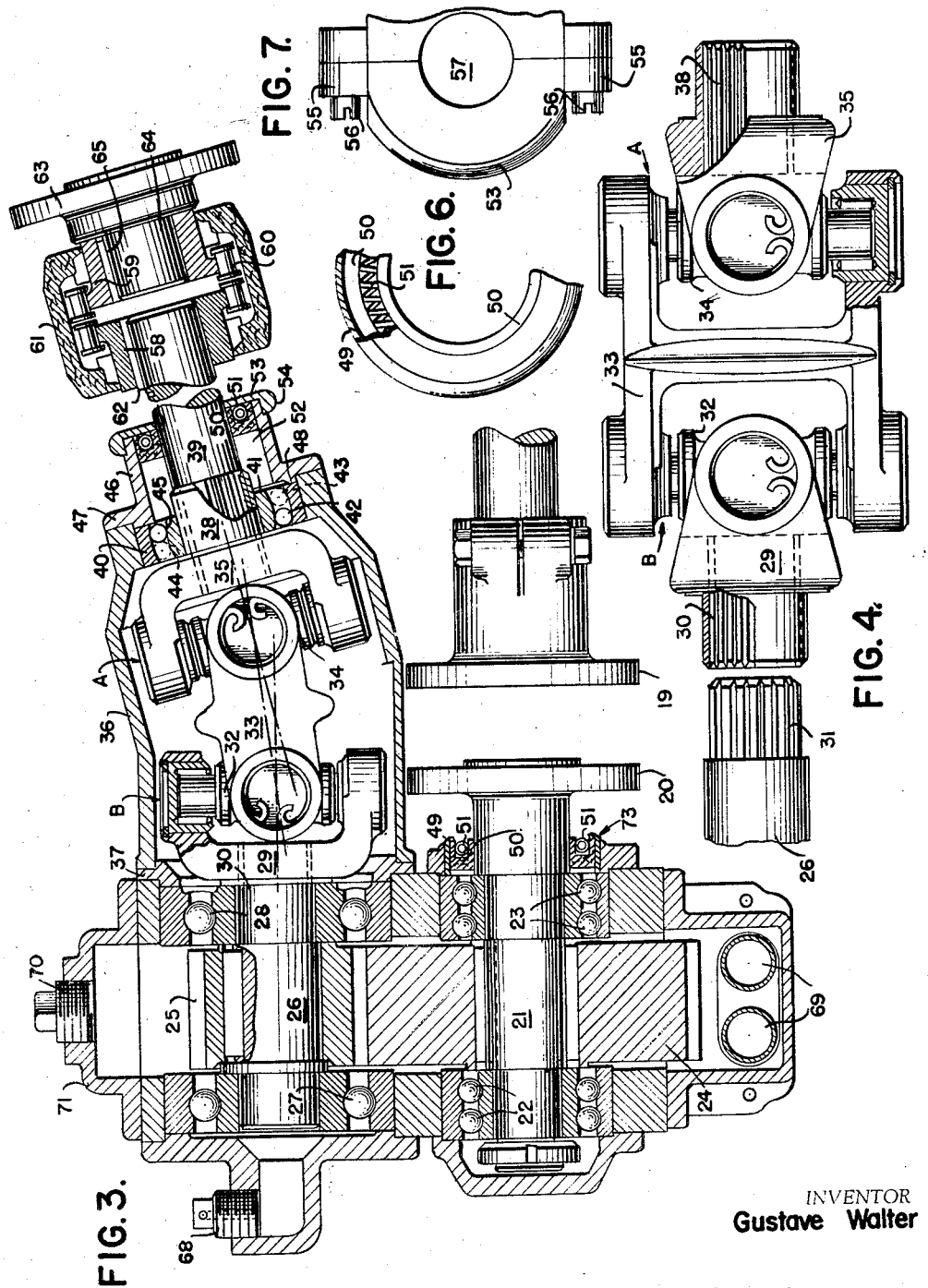

United States Patent Office 2,859,634
Patented Nov. 11, 1958

2,859,634

MARINE V-DRIVE

Gustave Walter, Jersey City, N. J.

Application September 8, 1954, Serial No. 454,675

3 Claims. (Cl. 74—414)

The present invention relates to marine V-drive, which generally is an old form of drive and enables the engine to be installed in the stern of the boat with the engine shaft line and the propeller shaft line intersecting in substantially an acute angle, at which point of intersection intermeshing transmission gears have been provided for the transmission of rotary motion from the engine to the vessel propeller.

Heretofore the transmission gears have been conical gears, intermeshing and made fast on gear shafts angularly disposed at an acute angle ranging anywhere from 9 to 15 degrees. Due to difficulties in producing these types of gears and gear housing the complete units have proved expensive.

A further proposal has been to employ a pair of external universal joints providing the necessary angularity, which arrangement has also been referred to as a transfer drive. External unprotected and exposed universal joints are objectionable as hereinafter developed. Such universal joints were widely separated and unless accurately installed with each universal joint having the same angle give rise to torsional vibration in the line shafting and the drive.

According to the present invention the drive comprises two gears on substantially parallel shafts with close-coupled universal joints built into the gear case not only for receiving complete lubrication from the gear oil in the case, but also for providing the necessary angularity of the input shaft to align with the engine shaft.

It is therefore a further object of the invention to provide a built-in angle V-drive unit which does away with the objectionable external universal joints and provides parallel shafts and transmission gears which are easy and inexpensive to produce and to assemble.

A further object of the invention is to provide a fully encased drive involving a high safety factor in case of breakage of either of the universal joints in that all parts are contained in a substantially rigid cast housing or gear case which will prevent parts from flying off at tangent and also preventing personnel from becoming injured by accidentally touching the drive.

Marine propeller shafts rotate at anywhere from 1,000 to 5,000 revolutions per minute. When subject to torsional vibration, particularly in and about the V-drive mechanism, damage is caused to ball bearings, the gears and all rotating parts as such torsional vibration sets up destructive forces in all rotating parts, causes fatigue in the rotating parts and in the boat itself in which there is set up sympathetic or resonant harmonic vibration which is not only annoying to passengers but also destructive to the engine bearings and other movable parts. Such torsional vibration creates impacts on ball bearings, axial twisting of shafts and resultant breakage. Such vibration tends to loosen the fastenings in the boats, rivets, screws and other fastenings that hold planking and other parts, and creates strain on ribbing which are the parts that hold the boat together.

The invention aims to eliminate, or reduce to a minimum, this torsional vibration and the consequent sympathetic vibration and therefore promotes safety and protection as well as preserving the drive and adjacent movable parts in uniform and constant good working order.

The invention aims to reduce the source of this torsional vibration by employing in the drive line two close-coupled universal joints so related and coupled together and coupled in the drive line that torsional vibration set up in the driver universal joint will be cancelled out, or substantially cancelled out, in the follower universal joint. These close coupled universal joints are contained within an accurately machined angle housing; each joint subtended by one half of the total gear offset angle. This eliminates the possibility of joint angles becoming more than minutely dissimilar.

The invention also contemplates a lubrication system by which the motion of the gears acts to pump the oil from the gear case into the universals in the universal housing and into and through a self-aligning bearing which compensates for the quivering motion of the input shaft incident to minute deflections of input shaft or slight misalignment of engine to V-drive.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is a longitudinal vertical sectional view taken through the improved V-drive.

Figure 4 is a top plan view of a form of close-coupled universal joints employed in connection with the invention with parts shown in section and parts broken away.

Figure 6 is a fragmentary end elevational view with parts broken away and parts shown in section of a form of flexible oil seal employed.

Figure 7 is an end elevational view of a form of an alignment split collar used during installation only.

Figure 1:
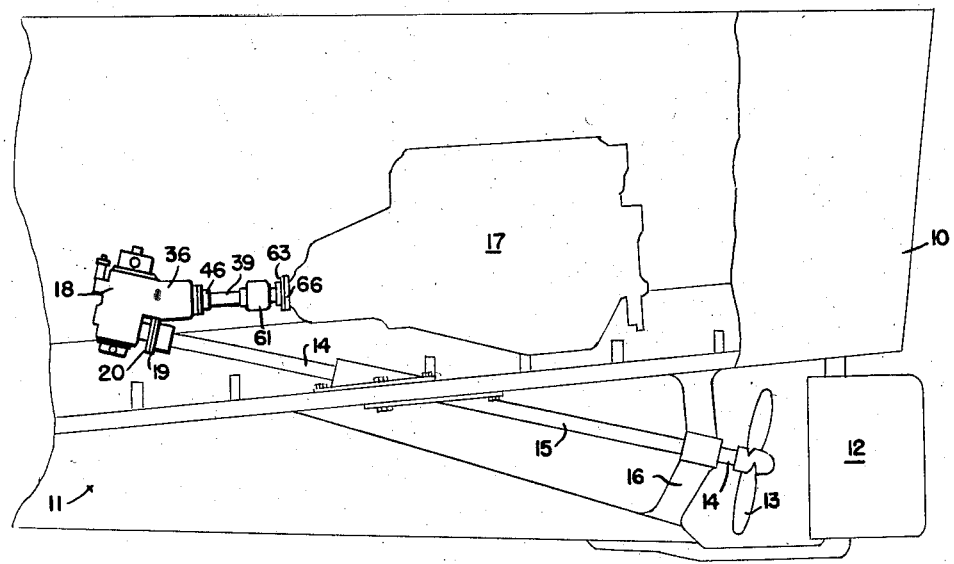
Figure 1 is a side elevational view of a marine V-drive constructed in accordance with the present invention and shown as mounted in the rear portion of a vessel, the parts of which are broken away to reveal the V-drive installation.
Figure 5:
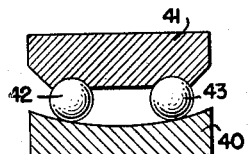
Figure 5 is a sectional view of a form of self-aligning bearing employed.
Figure 2:
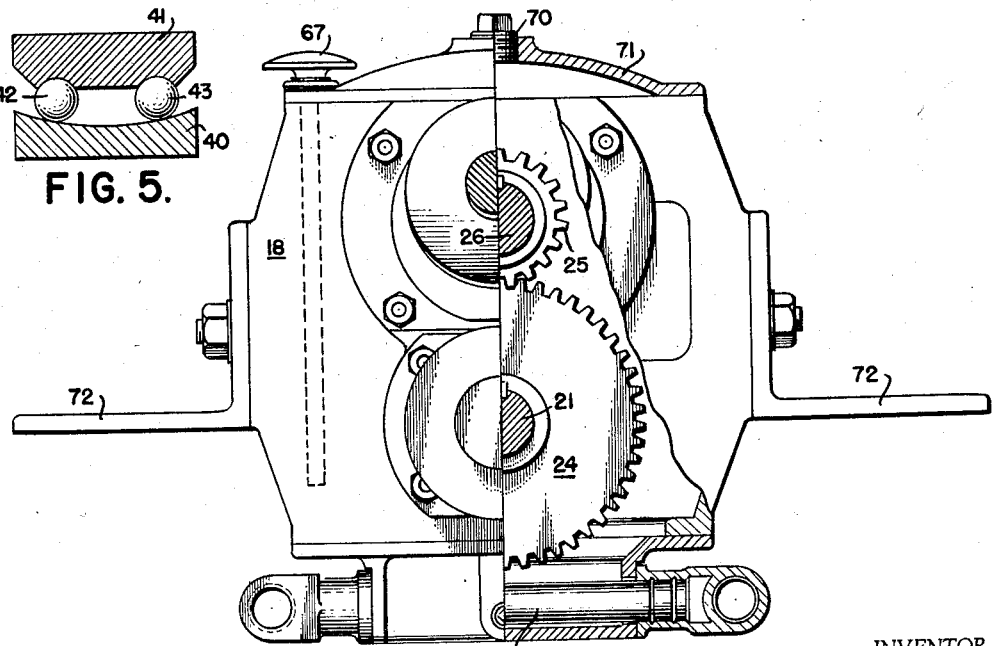
Figure 2 is an end elevational view, taken on an enlarged scale, through the V-drive gear case with parts broken way and parts shown in section.

Referring more particularly to the drawings, 10 designates the hull of a boat having the keel 11, rudder 12 and propeller 13.

The propeller is driven and carried by a propeller shaft 14 which extends through a propeller shaft tube or casing 15 extending through the hull 10 in a conventional manner. The propeller shaft 14 and tube 15 are supported at or near their rear ends by a strut bearing 16.

Within the hull 10 is installed a suitable engine or motor 17 mounted in the stern with its power shaft extending forwardly and connected to drive the propeller shaft 14 through a V-drive housed in a case 18.

The forward end of the propeller shaft 14 is equipped with a propeller flange 19 adapted to be bolted or otherwise secured to the outdriving flange 20 of an output gear shaft 21 mounted in ball or roller or other bearings 22, 23 in the gear case 18. An outdriving gear 24 is made fast upon the shaft 21 and meshes with a drive pinion 25 fast on a pinion shaft 26 journaled in ball, roller or other bearings 27 and 28 mounted in the drive or gear case 18.

The shafts 21, 26 are substantially parallel and the axes of the gear 24 and drive pinion 25 are likewise substantially parallel.

The pinion shaft 26 is driven by a follower end yoke 29 of a universal joint B. The yoke 29 carries an internally splined sleeve 30 mounted within the bearings 28 and enveloping and interlocked with the splined end 31 of pinion shaft 26.

A spider and needle bearing assembly 32 is pivotally mounted in the end yoke 29 and in a connecting yoke 33 in which latter is also pivotally mounted the spider and needle bearing assembly 34 of the second universal joint A. The drive end yoke 35 of the universal joint A is pivoted upon the needle bearing assembly 34 at right angles to the pivotal axis of this assembly about the connecting yoke 33.

The two universal joints A and B are close-coupled through the short connecting yoke 33 so that both of these universal joints may be confined and protected in an angle housing 36 which is connected by an adapter plate 37 to the gear case 18. The interior of the housing 36 is in open communication with the internal space of the gear case 18.

The drive end yoke 35 of universal joint A carries an internally splined sleeve 38 into which is slip fitted the complementally splined end of a connecting or input shaft 39. The sleeve 38 is supported in the housing 36 and preferably in the after end of this housing by an appropriate bearing having certain characteristics as hereinafter described and which includes an outer race 40 fixed against rotation in the after open end of the housing 36. The outer race 40 is internally spherical or pursuant to a section of a sphere and is of sufficient axial length to accommodate two sets of ball bearings 42, 43 which run around in annular grooves 44, 45 in the inner race 41 which is affixed to rotate with the sleeve 38. A tubular cover 46 is provided for the angle housing 36 and extends off the after end of the housing, such cover being provided with a perforated or other outstanding flange 47 for abutting the after end of the angle housing 36 to which it may be affixed by bolts or otherwise. Internally the cover 46 affords a shoulder 48 to abut the outer race 40.

In the after end of the tubular cover 46 is fitted a flexible oil seal which may be of that variety pursuant to U. S. Patent 2,240,332 and comprises a metallic outer ring 49, a rubber or flexible liner 50 and a spiral or other contractile spring 51 housed within the ring 49 and operative upon the liner to cause the same to tightly embrace the input shaft 39 in such wise as to prevent leakage of oil around the shaft and between the shaft and the liner 50.

Between the self aligning bearing 40, 41 and the flexible oil seal 49 is a lubricant chamber 52 which is substantially in alignment with the ball bearings 42, 43.

A temporary alignment collar 53 is fitted up against the after end of the cover 46 and is provided with a forwardly projecting flange 54 to fit over a portion of the tubular cover 46. This alignment collar 53 is a split or divided collar or disc having radially outstanding perforated and threaded ears 55 adjacent its split sections to receive threaded bolts, screws or other fastenings 56 by which the two half sections of the collar 53 may be drawn together upon the cover 46. The collar 53 is also formed with a central opening 57 of a diameter to fit the external diameter of the input shaft 39.

A flexible coupling, preferably of the roller chain type, is provided to drive the input shaft 39 from the engine shaft and this flexible coupling generally comprises sleeve sections 58 and 59 having a roller chain 60 in mesh with both sections. A cover 61 houses the coupling.

The after end of the input shafts 39 extends only into the sleeve section 58. A spline 62 on the input shaft 39 is received in a groove in the sleeve section 58 so that these two members are in driving relation. A front flange or adapter 63 is made fast to an adapter shaft 64 having an adapter spline 65 engaged in a groove in the sleeve section 59 of the flexible coupling. The front flange or adapter 63 is bolted or otherwise connected in driving relation to the engine flange 66.

An oil level gauge 67 is insertible down into the body of oil in the case 18 and is withdrawable to show the oil level.

The case 18 is also provided with a breather plug or cap 68 to avoid the formation of pressure or vacuum particularly in the upper portion of the case 18 above the oil level.

In the base of the case 18 may be mounted cooling tubes 69 for preventing the oil from rising above a preselected temperature level.

Oil may be introduced to the case 18 through a filler cap 70 threaded or otherwise removably fitted in a cover plate 71 which caps the case 18.

The entire V-drive, as a unit contained within the case 18, may be mounted in suitable position upon suitable supports by the mounting brackets 72.

In the use of the device, the engine 17 drives the engine flange 66 and through the front adapter flange 63, which is affixed to the engine flange 66, the drive is transmitted to the shaft 64, its spline 65, the sleeve section 59 of the flexible coupling and then through the roller chain 60 to the companion sleeve section 58 of the flexible coupling by which the drive is transmitted through the spline 62 to the input shaft 39.

The drive is continued from the input shaft 39 to universal joint A and thence angularly through the connecting yoke 33 to the second universal joint B, the yoke 29 of which is coaxial with the pinion shaft 26, and the drive pinion 25. The pinion 25 drives the outdriving gear 24, the output shaft 21, outdriving flange 20, propeller flange 19, propeller shaft 14 and the propeller 13.

It will be noted that the V-drive pursuant to this invention differs from the conventional accepted principle of V-drive mechanisms in that it does away with the angular type of gear which is costly to fabricate. Furthermore, by short coupling a double universal joint which enables the same to be fully enclosed, protection is afforded from damage which would result should any member of the universal joints fail, resulting in flying apart of individual members due to the high speed of such drives. Damage is avoided which would otherwise result to adjoining parts of the boat, such as structural components, gasoline tanks with the possibility of explosions as well as injury to occupants of the vessel. Moreover as the complete components forming the universal joints are completely enclosed, they are automatically lubricated with the gears in the gear case due to the communication of the angle housing 36 with the case 18.

The so-called self-aligning bearing 40, 41 is used to compensate for the small differentials in position relative to engine and gear encountered while boat is operating due partially to expansion and contraction of metals and partially to deforming of the hull while under driving stress of engines and due also to the elements of disturbed water in which the boat operates. The self-aligning bearing 40 and flexible coupling also compensate for the minute deflection of line-up by engines which are flexibly installed using rubber mountings to dampen vibration.

For accurate line-up to engine the alignment collar 53 is put in place to maintain angle of input shaft 39 rigidly in position until the engine is properly lined up to the drive and gear unit securely connected to the outdriving flange 66 of the engine by the adapter 63. The engine is lined up and then shimmed with small slivers of metal or other adjustments on its base support to line up to the drive.

The alignment collar 53 is removed after installation is completed because of its rigidity. When removed the input shaft 39, which is also the connecting shaft, is allowed to operate with sufficient flexibility in the flexible oil seal 49 and through the self-aligning bearing 40, 41. Small deviations from the axial line can be accommodated by these two members 49 and 40—41 while not diminishing their functions of holding the oil from leaking out of the gear case 18 and from supporting the collar 38 of the input yoke 35 by the self-aligning bearing 40, 41.

In other words, the main mechanism of the gear itself is designed to provide efficient universal joints arranged in such a manner to afford a continuous even flow from engine to the gear box and at the same time fully enclosing these members and also providing enough flexibility to compensate for variations in alignment of gear to engine yet being sufficiently rigid to support the indriving sleeve of the yoke and to keep oil from escaping from the gear case 18.

A flexible oil seal 73 similar to the seal 49 surrounds the output shaft 21 outwardly of the bearings 23. The seals 49 and 73 prevent any of the transmission oil in the gear case and in the universal angle housing 36 from escaping. The oil in the case 18 and angle housing 36 is free to flow through the gears and their bearings, through the universal joints A and B and through the self aligning bearings 40, 41 and outwardly thereof as far as the seal 40, 41. The arrangement is such that the lubricating oil which ordinarily is supplied to the gear case 18 to lubricate the gears therein is extended to flow through the universal housing 36 so as to maintain both of the close-coupled universals A and B constantly in a bath of oil, which bath of oil also extends to the self-aligning bearing 40, 41. The rubber or other flexible inner rings or liners 50 of the flexible oil seals 49 and 73 supply sufficient flexibility or resiliency to permit the movement or displacement of the shafts 39 and 14 from the true axial line of the drive through minute differences.

The self-aligning bearing 40, 41 has the internal surface of its outer ring curved longitudinally so that the two sets of ball bearings 42, 43 may rock around on this curved or spherical surface incident to the wobbling or small deviations of the shaft 39 from the true axial drive line. Thus the inner flexible liner 50 of the oil seal 49 and the peculiar construction of the self-aligning bearing 40, 41 contribute mutually to permit of this wobbling or deviation of the connector shaft 39. The sealing ring 49 also contributes to the transmitting of that small deviation to the trunnion of universal joint A which is finally cancelled out by the trunnion of universal joint B.

Any quiver or wobbling movement in the input shaft 39 is communicated to the yoke of the universal joint A and this yoke is given sufficient clearance in the case 36 to allow for any such quivering or wobbling movement. Such quivering or displacement movement is transmitted by the yoke of the first universal joint A to the trunnion of that joint and thence to the linkage which connects the two universal joints, but such quivering or wobbling movement is cancelled out in the trunnion of the second universal joint B and is not transmitted to the top gear shaft 25 in the gear case 18. The universal joints may be pursuant to prior U. S. Patents Nos. 898,423; 1,558,763 and 2,432,395. The joints are constant velocity universal joints.

The housing 36 is angled or elbowed intermediately corresponding in a general way to the angle at which the connector shaft 39 joints through the universals with the shaft 26 of the top gear 25. If for example this angle is 15 degrees, the angle between the axis of the input shaft 39 and the connecting yoke 33 will be 7½ degrees and similarly the angle between the long axis of the yoke 33 and the axis of the shaft 26 will be 7½ degrees.

The flexible coupling 61 in which the after-end of the shaft 39 is fitted also permits of this wobbling or quivering movement of the shaft 39.

By placing the engines in the stern more usable space is provided for living quarters on pleasure boats and cargo space on work boats. The engine compartment becomes a very compacted unit and can be bulk-headed from the rest of the boat, reducing engine noise and increasing safety. The V-drive makes it possible to use inboard engines in small cruisers without sacrificing valuable cabin space.

While conventional V-drives employ expensive angle gears and housings to provide the V angle, the present invention accomplishes this purpose by employing specially constructed close-coupled universal joints which increase compactness and reduce cost. These universal joints are fully encased and lubricated by the oil in the gear housing. Parallel helical gears of heat treated alloy steel are employed and provide a variety of ratios to suit all installations. The splined shaft 39 of suitable length with an adapter connects the V-drive with the engine flange 66. The flexible coupling 61 with solid connecting shaft may be used for short connections while a tubular shaft may be furnished for longer installations. The anti-friction bearings are heavy to withstand propeller thrust and are built within the unit. Water cooling 69 is provided for adequate heat exchange to assure continuous operation at high speeds.

It will be noted that the V-drive as a unit contained within the case 18 is adjustable angularly both vertically and horizontally. The V-drive should be shimmed and tightened for accurate line-up with the propeller shaft 14 after preliminary positioning is finished. The cover 61 and chain 60 of the flexible coupling should first be removed. The splined shaft 39 is then cut to the proper length, keyed to half of the flexible coupling 58 and slip-fastened to the V-drive at 38. The other half 63 of the flexible coupling with the adapter 63 is bolted to the engine flange 66 and the engine must then be positioned so that both halves of the flexible coupling are in line. The chain can then be replaced and the grease cover 61 filled with light Alemite lubricant and bolted to the coupling.

The female splined end 38 of the V-drive is held flexibly in position by the self-aligning bearing 40, 41 so as to relieve any strain which might develop due to a slight misalignment of the engine to the V-drive. This part 38 is also a part of the double universal joint A, B used to form the V angle of the V-drive.

This double universal joint A, B is arranged so that each joint takes one half of the V angle which is generally 15 degrees and by properly having the yokes in line, joint B cancels out the erratic movement of joint A, which is characteristic of universal joints. This double universal arrangement provides a smooth flow of power from the engine to the propeller shaft. In addition, the double universal joints are flexible, laterally as well as angularly, and they couple the male splined end of the connecting shaft 39 on one side to the male splined end of the indriving pinion shaft 26 of the gear box in a flexible way and thereby eliminate strains caused by misalignment of the shafts, which would be the case when only one universal joint, regardless of type, is used.

Having taken care of the V angle in the manner described above, it is only necessary to use conventional gears, spur, helical or herringbone, with axes parallel to each other to transmit the driving power from the input shaft to the output shaft of the gear box and then through the propeller shaft to the propeller. The size of the gears can be equal resulting in the same revolutions per minute of the propeller as the engine, or they can be changed for either a decrease or an increase of propeller speed, whichever is best for the propulsion of the boat.

The flexible self-aligning bearing 40, 41 supports the splined end 38 of the universal joint. The outer shell 40 of this self aligning bearing fits into the angle housing 36 of the V-drive and is held lengthwise in position by the shoulder 48 of the cover flange 47. The extended end of this cover 46 contains the oil seal 49 with its inside diameter concentric with the inside diameter of the self aligning bearing 40, 41. The outside or external surface of this extended portion 46 is also turned concentric with the self aligning bearing 40, 41 and provides an accurate space for the removable aligning clamp 53 to hold the connecting shaft 39 in the exact angular position of the V-drive and axially parallel with the self aligning bearing 40, 41 and the center 50 of the flexible oil seal member.

Installation of the V-drive is as follows: The outdriving shaft 21 is first lined up to the propeller shaft 14 by means of accurately machined coupling flanges 19, 20 which are rigidly bolted together. The engine 17 is then lined up to the V-drive and is usually connected by means of the adapter 66, 63 and the flexible coupling 60 and connecting shaft 39 to the V-drive. When the installation is completed the aligning clamp 53 may be removed and the self aligning ball bearing 40, 41 and the flexible oil seal 49 are then free to compensate for the minor misalignment of the engine to the V-drive, usually caused by torsional strains, thermal expansion and contraction of metals and distorsions within the boat itself. This alignment clamp 53 can again be used to recheck the alignment of the engine to the gear box whenever necessary.

For each complete revolution of a single Cardan joint, operating at a specified angle, there are two positions in which the driven shaft has advanced in rotation relative to the driving shaft and two intermediary positions in which the driven shaft has lagged a similar amount. These advances and lags, alternating twice for each revolution, result in pulsating, variable speed of the driven shaft.

As the joint angle increases, the amplitudes of the pulsatings increase at an even more rapid rate until they have a destructive effect upon the joint as well as the parts connected with it.

Constant speed rotation of the driving shaft through 360 degrees may be represented by a circle with a constant vector, $c$, for the radius. Driven shaft variable-speed rotation, on the other hand, may be represented by a superimposed concentric ellipse in which the instantaneous speeds at any given angle of rotation are indicated by the variable length of vector, $v$. There are four points at the intersection of the ellipse and circle at which the speeds of both shafts are matched. The included areas between ellipse and circle comprise the total gain or loss of speed of the driven over the driving shaft in a typical universal joint, and being alike, but opposed, cancel out.

When the drive shaft runs at a constant speed, the follower shaft revolves at maximum speed when the drive shaft occupies the position shown in the drawing, and the minimum speed of the follower shaft occurs when the fork of the driving shaft has turned 90 degrees from the position illustrated. The maximum speed of the driven shaft may be obtained by multiplying the speed of the driving shaft by the secant of the angle intersected by the two shafts. The minimum speed of the driven speed equals the speed of the driver multiplied by the cosine of this angle. Thus, if the driver rotates at a constant speed of 1000 revolutions per minute and shaft angle is 7½ degrees, the maximum speed of the driven shaft is at a rate equal to $1.0086 \times 1000 = 1,008.6$ R. P. M. The minimum speed rate equals $.99144 \times 1000 = 991.44$ R. P. M.; therefore, the extreme variation equals $1,008.60 - 991.44 = 17.16$ R. P. M. at this given speed and angle.

This variation may be avoided if the driver and driven shafts are connected with the double universal joint, provided it is properly arranged and located.

First the connecting intermediate yoke must be located so as to make equal angles with the driving and driven shafts; second, the driving pins on the intermediate yoke must lay directly in line and each lies in the plane of the adjacent driver and driven shafts.

Under these conditions, a reduction or increase of the speed of the intermediate yoke, as compared with that of the driving shaft, caused by the first coupling, will be exactly neutralized by an equal but opposite change of speed on the driven shaft as compared with that of the intermediate yoke, due to the second coupling. The net result is that both main shafts will have the same speed at any instant. The compensating action of the couplings is due to their symmetrical arrangement with regard to the two planes containing the driver and driven shafts.

Going back to the previous example it was found that a single universal joint being driven at a constant 1000 revolutions per minute and having a shaft angle of 7½ degrees obtained a maximum speed of 1,008.6 R. P. M. By using a double universal joint the end of the yoke connected to the driver will still be speeded up this same amount but the other end of the yoke connected to the driven shaft will be slowed down by the cosine of the angle. The speed on the driven end becomes $$1,008.6 \times .99144 = 1000 \text{ R. P. M.}$$

Thus, there is a neutralizing effect within a double universal joint.

Although I have disclosed herein the best form of the invention known to me at this time, I reserve the right to all such modifications and changes as may come within the scope of the following claims.

What I claim is:

1. For use with a boat having a previously installed inclined propeller shaft and an engine mounted above the propeller shaft with its output shaft facing forwardly, a marine drive comprising a gear case, substantially parallel input and output shafts journalled in said case, parallel gears fixed to said shafts and in intermeshing engagement, means to mount the gear case in a diagonal position in the boat with the output shaft in alignment with the axis of the propeller shaft, means for coupling the output shaft and the propeller shaft, an angled universal housing coupled to the after end of the gear case and communicating with the after end of the input shaft, a pair of close-coupled angularly related universal joints in said housing, the forward universal joint having a forward yoke rotating in a substantially parallel plane with the input shaft and coupled thereto in driving relation by axially movable slip-fit, the after yoke of the after universal rotating in a plane substantially parallel to that of the engine output shaft, a connecting shaft having a forward end in driving relation to said after yoke, a flexible coupling connected to the after end of the connecting shaft, and an adapter connected to the rear portion of said flexible coupling and adapted to be connected to the engine output shaft.

2. For use in a boat with an inclined previously installed propeller shaft and a previously mounted engine above the propeller shaft with its power output shaft faced in a forward direction, a marine V-drive comprising a gear case, input and output shafts mounted in said gear case in substantially parallel relation, input and output parallel spur gears fixed to said input and output shafts and in intermeshing relation, means for mounting the gear case in the boat with its output shaft in alignment with the propeller shaft, means for connecting the output shaft with the propeller shaft, a universal housing connected to the rear upper portion of the gear case about and communicating with the after end of the input shaft, a pair of close-coupled angularly related universal joints in said housing with the forward universal joint coupled to drive the input shaft, a connecting shaft having its axis inclined upwardly and rearwardly with respect to the input shaft and having its forward end connected to drive the rear universal, a bearing for said yoke and the forward end of the connecting shaft adapted to permit limited fore and aft rocking movement, an adapter for connecting the after end portion of the connecting shaft with the engine output shaft, and a flexible coupling between said adapter and connecting shaft.

3. For use with a boat having an inclined propeller shaft and an engine mounted above the propeller shaft and with its power shaft faced forwardly, a marine V-drive comprising a gear case, substantially parallel input and output shafts in said gear case, parallel intermeshing spur input and output gears affixed to said shafts, means for mounting the case in an inclined position in the boat with the output shaft in alignment with the propeller shaft, means for coupling the output shaft to the propeller shaft, an angled universal housing affixed to the after upper portion of the gear case surrounding the after end of the input shaft and in communication with the interior space of the gear case to receive lubricant therefrom, a pair of close-coupled angularly related universal joints in said housing with the forward universal joint coupled in driving relation to said input shaft, an outer bearing race fitted to the after end of the housing, an inner race affixed to the after yoke of the after universal joint, bearings between said races for permitting said after yoke a limited rocking fore and aft motion, a connecting shaft in driving relation and slip-fitted to said after yoke and also journalled at its forward end upon said bearings, a cover for the angle housing extending rearwardly from said housing and having a cylindrical portion embracing the forward end portion of said connecting shaft, a flexible oil seal surrounding said connecting shaft and fitted to the after portion of said cover, a flexible coupling connected at its forward portion to the after portion of said connecting shaft, and an adapter adapted to be connected to the engine output shaft and to the after portion of said flexible coupling.

References Cited in the file of this patent

UNITED STATES PATENTS

| | | |
|---|---|---|
| 1,548,917 | Vincent | Aug. 11, 1925 |
| 2,164,487 | Beckjord | July 4, 1939 |
| 2,410,077 | Keese | Oct. 29, 1946 |

FOREIGN PATENTS

| | | |
|---|---|---|
| 113,307 | Sweden | Oct. 20, 1945 |
| 554,284 | Great Britain | June 28, 1943 |